United States Patent [19]
Junck et al.

[11] 4,071,106
[45] Jan. 31, 1978

[54] AUXILIARY HYDROSTATIC WHEEL DRIVE

[75] Inventors: John A. Junck, Joliet; Joseph A. Dezelan, Western Springs; Donald J. Larson; Robert W. White, both of Joliet, all of Ill.

[73] Assignee: Caterpillar Tractor Co., Peoria, Ill.

[21] Appl. No.: 727,187

[22] Filed: Sept. 27, 1976

Related U.S. Application Data

[63] Continuation-in-part of Ser. No. 432,968, Jan. 14, 1974, abandoned.

[51] Int. Cl.² .......................................... B60K 25/00
[52] U.S. Cl. .................................. 180/44 F; 180/66 R
[58] Field of Search ................ 180/66, 44 F, 44 M, 180/6.48, 53 CD, 44 R, 43 R

[56] References Cited

U.S. PATENT DOCUMENTS

| | | | |
|---|---|---|---|
| 3,272,279 | 9/1966 | Budzich | 180/44 F |
| 3,354,978 | 11/1967 | Budzich | 180/44 M |
| 3,458,005 | 7/1969 | Malm et al. | 180/44 |
| 3,480,099 | 11/1969 | Nighswonger et al. | 180/44 |
| 3,481,419 | 12/1969 | Kress et al. | 180/44 |
| 3,506,081 | 4/1970 | Rumsey | 180/44 F |
| 3,535,984 | 10/1970 | Anderson | 91/506 |
| 3,680,652 | 8/1972 | Greene | 180/22 |
| 3,827,528 | 8/1974 | Shaffer | 180/44 M |
| 3,882,980 | 5/1975 | Blake | 192/3.57 |

Primary Examiner—Kenneth H. Betts
Attorney, Agent, or Firm—Phillips, Moore, Weissenberger, Lempio & Majestic

[57] ABSTRACT

A supplementary hydrostatic front wheel drive for a motor grader or the like utilizes pump flow from an already existing implement system as the source of supply to operate the drive wheel motors. The drive wheel motors are of the variable displacement over center type, and the system provides equal flow to both drive wheel motors to establish a synchronized rotational speed of both drive wheel motors. The displacements of the drive wheel motors are responsive to vehicle ground speed. The drive wheel components may include friction driving means which are responsive to the primary vehicle drive system.

3 Claims, 5 Drawing Figures

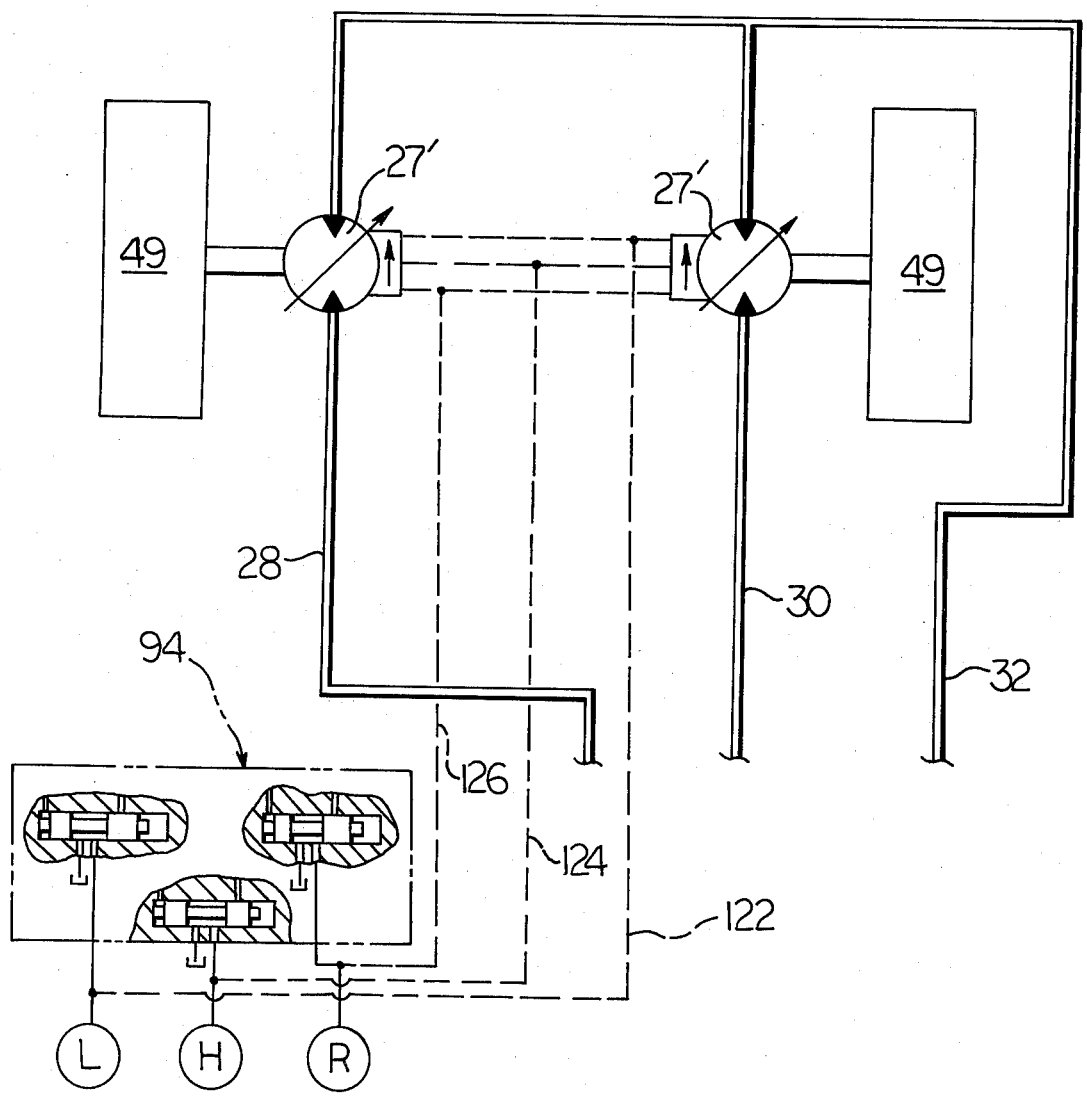

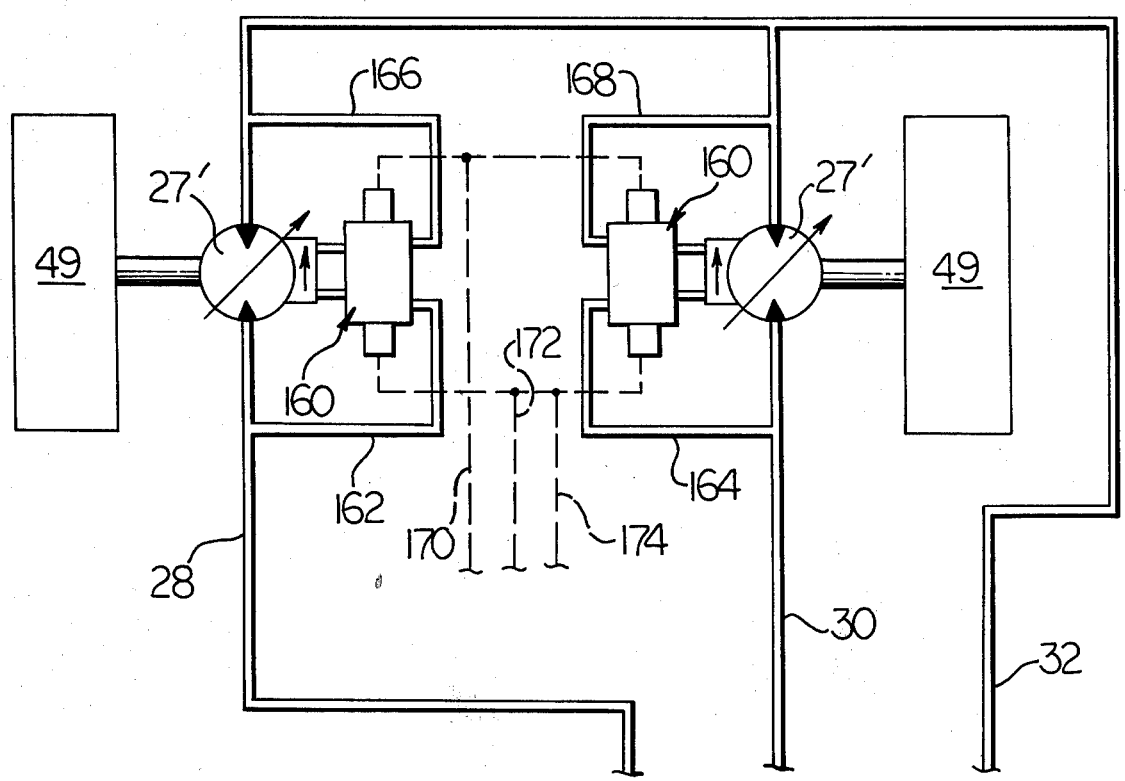

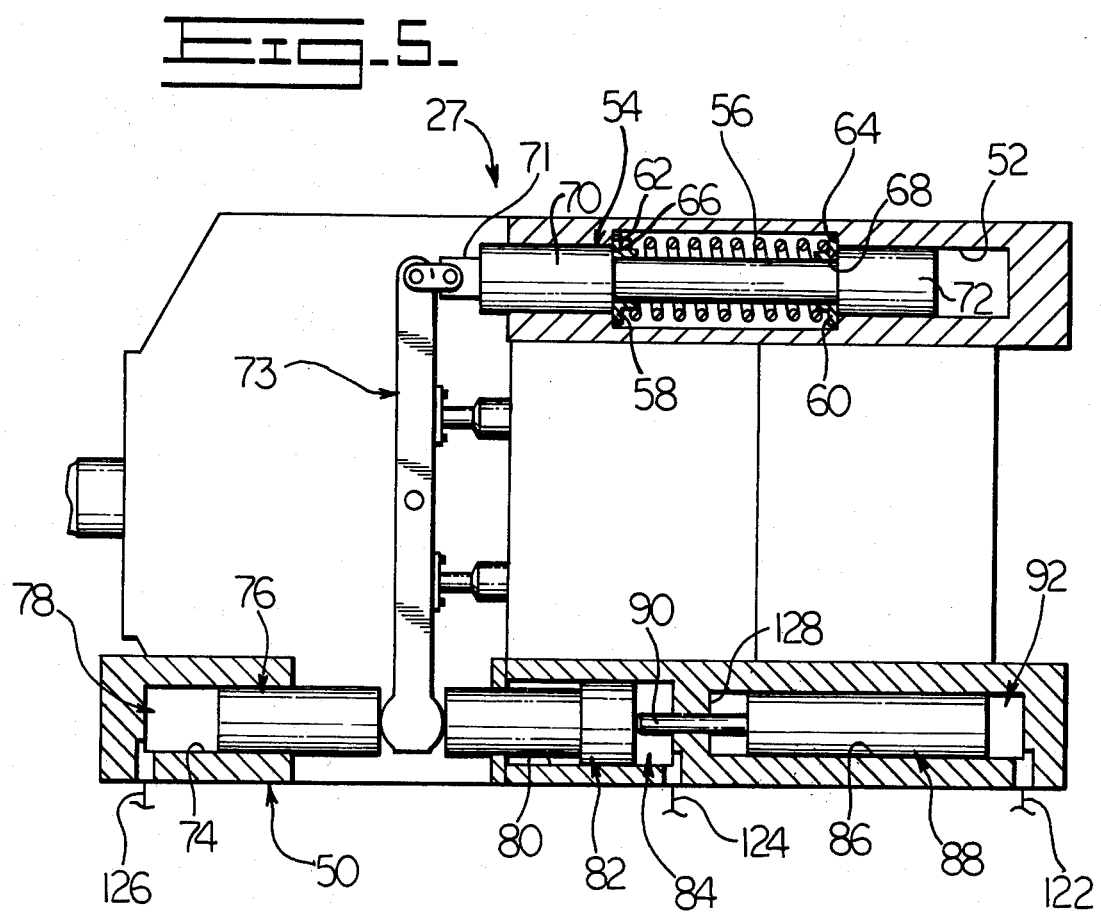

AUXILIARY HYDROSTATIC WHEEL DRIVE

CROSS REFERENCE TO RELATED APPLICATION

This is a continuation-in-part of U.S. application Ser. No. 432,968, filed Jan. 14, 1974, now abandoned.

BACKGROUND OF THE INVENTION

This invention relates to an auxiliary hydrostatic front wheel drive system for a vehicle and more particularly to a system which utilizes variable displacement hydrostatic drive motors.

Drive systems of the general type described herein are disclosed in U.S. Pat. No. 3,458,005 to Malm et al, U.S. Pat. No. 3,480,099 to Nighswonger et al, and U.S. Pat. No. 3,481,419 to Kress et al. While these systems would appear to be effective in the use for which they are designed, it is to be noted that the systems thereof utilize fixed displacement hydraulic motors for driving the front wheels of the vehicle in the auxiliary drive system thereof. Thus, there is no teaching of a system which is specifically to be used in combination with fluid drive motors of the variable displacement type. Of particular interest herein is an association of the displacements of the auxiliary drive motors in response to a primary drive condition of the vehicle. It will be understood, of course, that none of the three references cited above are concerned with such a system.

Also of interest are U.S. Pat. No. 3,354,978 to Budzich, disclosing a hydraulic motor responsive to a pump, U.S. Pat. No. 3,680,652 to Greene, wherein the displacement of a hydraulic motor is varied by a hand lever, and U.S. Pat. No. 3,827,528 to Shaffer, wherein the displacement of a motor is responsive to motor line pressure.

Of more general interest in this area are U.S. Pat. No. 2,818,699 to Clemson, U.S. Pat. No. 3,153,908 to Lawrence, U.S. Pat. No. 3,184,994 to Stahl, U.S. Pat. No. 3,186,506 to Leach, U.S. Pat. No. 3,255,840 to Tangen, U.S. Pat. No. 3,272,576 to Budzich, U.S. Pat. No. 3,272,279 to Budzich, U.S. Pat. No. 3,302,741 to Brazuk, U.S. Pat. No. 3,354,977 to Swift, U.S. Pat. No. 3,391,753 to Anderson, U.S. Pat. No. 3,361,223 to Baver, U.S. Pat. No. 3,415,334 to Vriend, U.S. Pat. No. 3,469,648 to Cannon, U.S. Pat. No. 3,477,547 to Kress et al, U.S. Pat. No. 3,493,067 to Rumsey, U.S. Pat. No. 3,522,861 to Middlesworth et al, and U.S. Pat. No. 3,579,988 to Firth et al.

SUMMARY OF THE INVENTION

It is an object of this invention to provide an auxiliary front wheel drive system for a vehicle which uses variable displacement fluid motors to drive the front wheels thereof, and wherein the displacements of such fluid motors are varied in response to a primary drive condition of the vehicle.

It is a further object of this invention to provide a system which, while fulfilling the above object, is simple in design and effective in use.

Broadly stated, the invention is in a vehicle having a variable transmission control for determining a primary drive condition of the vehicle, and first and second variable displacement fluid motors associated with respective wheels of the vehicle. Means are included for transmitting power from the motors to drive the wheels, and fluid pump and a fluid supply associated therewith are further included. Fluid circuit means operatively connect the pump and the motors. The improvement in such vehicle comprises means operatively connecting the transmission control and the motors to vary the displacement of the motors in response to the transmission control to provide a rotative speed of the motors which correspond to the primary drive condition of the vehicle.

BRIEF DESCRIPTION OF THE DRAWINGS

These and other objects of the invention will become apparent from a study of the following specification and drawings, in which:

FIG. 3 is a schematic illustration of a third embodiment of an auxiliary front wheel drive system for a vehicle;

FIG. 4 is a schematic illustration of a fourth embodiment of an auxiliary front wheel drive system for a vehicle; and FIG. 5 is a sectional view of a variable displacement motor as used in the system.

DESCRIPTION OF THE PREFERRED EMBODIMENTS

Figure 1:
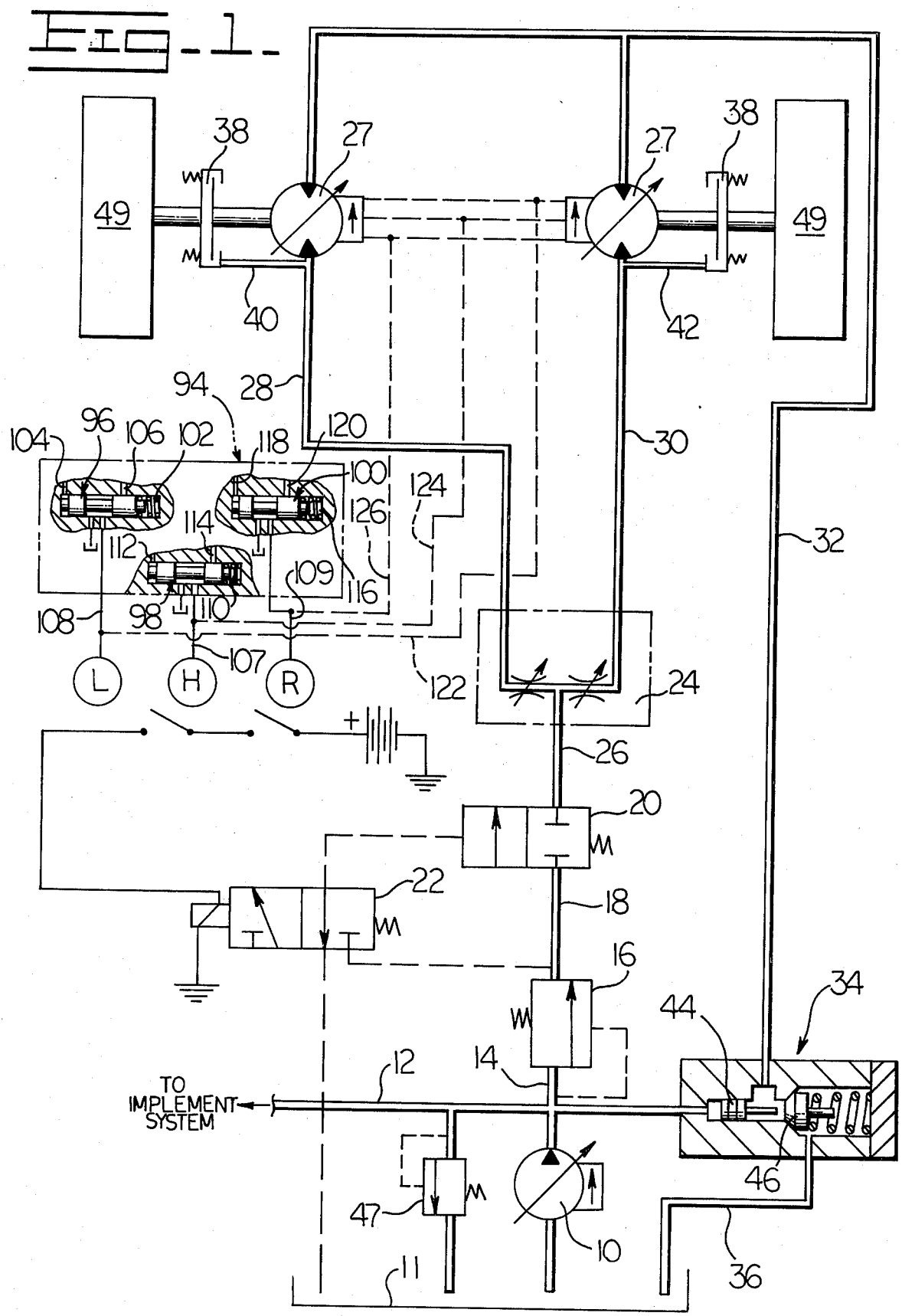
FIG. 1 is a schematic illustration of a first embodiment of auxiliary front wheel drive system for a vehicle.

Referring to FIG. 1, a variable displacement pressure compensated fluid pump 10 provides pressurized fluid flow from a fluid supply 11 associated therewith to both an implement system and a hydrostatic front wheel drive system by conduits 12,14 respectively. A priority valve 16 is disposed between the pump 10 and the front wheel drive system to maintain adequate flow and pressure to the implement system (not shown).

When adequate pressure is available, the priority valve 16 shifts to allow fluid flow through the conduit 18. An on/off valve 20 is hydraulically actuated by pressurized fluid from pump 10 through a valve which is controlled by a solenoid. The solenoid operated valve 22 is electrically actuated and selectively responsive to operator control. With valve 20 in the on position, pressurized fluid is directed to a flow divider 24 by a conduit 26. The flow divider 24 maintains equal distribution of fluid flow to the drive motors 27 via conduits 28,30. The flow divider 24 enables the motors 27 to rotate at basically the same speed. Return line 32 accepts discharge flow from both motors 27 and directs it to a restrictor valve 34 and further to tank 11 via a conduit 36.

The restrictor valve 34 maintains a predetermined back pressure in the system during startup which guarantees that there is an adequate amount of pressure is conduits 40,42 which are branches of conduits 28,30 respectively. Pressure is supplied from such conduits 40,42 to clutches 38 to effect a power transmitting or driving relation between the motors 27 and their respectively associated steerable vehicle front wheels 49. The connection between an output of a motor 27 and a wheel 49 may be made through a planetary drive or directly, as chosen.

Upon the pressure in the system reaching a predetermined value, pump pressure acting against a load piston 44 in the restrictor valve 34 causes the piston 44 to move against a poppet 46 and unseat the poppet 46 fully, allowing maximum free flow to tank 11.

The motors 27 are of the variable displacement, over center type, wherein the output speed thereof is dependent on the angular attitude of a swash plate generally similar to that, for example, shown in FIG. 11 of U.S. Pat. No. 3,535,984. One of such motors 27 is shown in FIG. 5, it being understood that the construction and operation of both motors 27 are the same.

The motor 27 includes a body 50 defining a first bore 52 within which is reciprocably disposed a spool 54. The spool 54 is biased into a centered position shown in FIG. 5 by means of a helical spring 56 under compression between first and second collars 58,60 which contact stepped portions 62,64 of the bore 52 and which bear on inwardly facing surfaces 66,68 of lands 70,72 of the spool 54 with the spool 54 in its centered position. It will be seen that the spool 54 may be moved rightwardly against the resilience of the spring 56 from the center position, and also leftwardly from the center position against the resilience of the spring 56.

The extended end 71 of the spool 54 is pivotally connected to the swash plate 73, the centered position of the spool 54 determining a substantially vertical position of the swash plate 73 as shown in FIG. 5, so that no driving output is provided by the motor 27. Thus, the swash plate 73 is resiliently biased into a position providing no drive output of the motor 27.

The body 50 defines a bore 74 within which is reciprocably disposed a spool 76, the body 50 and spool 76 defining a chamber 78. The spool 76 is positioned on one side of the swash plate 72. The body 50 defines another bore 80 in which is reciprocably disposed a spool 82, the spool 82 and body 50 defining a chamber 84. The spool 82 is positioned on the other side of the swash plate 72. The body 50 defines yet another bore 86, within which is reciprocably disposed a spool 88, the spool 88 having an extended portion 90 fixed thereto extending from the bore 86 into the chamber 84 and positionable to contact the spool 82. The spool 88 and body 50 define a chamber as shown at 92.

A variable transmission control is shown at 94. The variable transmission control 94 is shown in simplified form, including reciprocable spools 96,98,100, the reciprocable spool 96 being movable to a first position against the resilience of a spring 102 upon application of fluid pressure to conduit 104, to provide that fluid pressure is directed from conduit 106 past spool 96 into conduit 108 to a drive clutch operatively coupled with the rear wheels of the vehicle and indicated at L (low range) or to a second position under the resilience of spring 102 upon release of fluid pressure from conduit 104, as shown in FIG. 1 wherein pressure is released from the clutch L. Similarly, the second spool 98 is movable to a first position against the resilience of a spring 110 by introduction of fluid pressure into a conduit 112 to provide that fluid pressure is applied from a conduit 114 past the spool 98 into conduit 107 to a drive clutch H (high range) operatively coupled with the rear wheels of the vehicle. The spool 98 is also movable to a second position as shown in FIG. 1, under the resilience of spring 110 upon release of fluid pressure from conduit 112, wherein release of fluid pressure from the clutch H is provided. The third reciprocable spool 100 is movable to a first position against the resilience of a spring 116 upon application of fluid pressure thereto through a conduit 118, to provide direction of fluid pressure from a conduit 120 past the spool 100 into conduit 109 to a drive clutch R (reverse) operatively coupled with the rear wheels of the vehicle, the spool 100 being movable to a second position as shown in FIG. 1 under the resilience of the spring 116, upon release of fluid pressure in the conduit 118, to in turn provide release of fluid pressure from the clutch R. It will be understood that the operator of such a transmission control selectively provides actuation of one of the clutches L, H, or R, with fluid pressure being released from the other two clutches. Details of the construction and operation of a transmission generally along these lines are disclosed in U.S. Pat. No. 3,882,980, assigned to the assignee of this invention.

A conduit 122 interconnects the conduit 108 and chamber 92. A second conduit 124 interconnects the conduit 107 and the chamber 84. A third conduit 126 interconnects the conduit 109 and the chamber 78. If fluid pressure is applied to the clutch L, the spool 88 moves leftwardly into contact with the surface 128, the extended portion 90 meanwhile being in contact with the spool 82 to in turn move the swash plate 73 against the resilience of the spring 56, to in turn determine a first, low drive condition of the motor 27. The conduits 107,109,124,126 and chambers 78,84 are of course relieved of fluid pressure at this time.

Application of fluid pressure to the clutch H provides that fluid pressure is applied to the chamber 84, to move the spool 82 leftwardly further than it would be moved upon full leftward travel of the spool 88, fluid pressure being relieved from conduits 108,109,122,126 and chambers 78,92. Thus, the swash plate 73 is moved further against the resilience of the spring 56, to provide a motor drive output of a second, higher speed.

Upon application of fluid pressure to the clutch R, with fluid pressure relieved from the conduits 108,107,122,124 and chambers 84,92, fluid pressure is applied to the chamber 78 to move the swash plate 73 in an opposite direction against the resilience of the spring 56, due to the rightward movement of the spool 76, to provide a reverse drive condition of the motor 27.

Thus, it will be seen that the variable transmission control 94 determines a primary drive condition of the vehicle, i.e., through engagement of clutch L, clutch H, or clutch R. The fluid conduit means described above operatively connect the pump 10 and the motors 27. It will be seen that the pressure signals directed from the primary drive transmission control 94 through conduits 122,124,126 signal the variable displacement motors 27 to shift to angles which provide rotational speeds corresponding in magnitude to that of the primary drive condition of the vehicle. That is, if the clutch L is engaged, a low speed drive condition of the front wheels 49 is provided. If the clutch H is engaged through the variable transmission control 94, a high speed drive condition of the wheels 49 is provided. And, if the clutch R is engaged, a reverse drive condition of the front wheels 49 is provided. In this manner, the ground speed of the wheels 49 approximates that of the rear driven wheels of the vehicle.

Through the use of the above-described flow divider, the motors 27 are driven in parallel.

Relief valve 47 protects pump 10 from excessive back pressures.

Figure 2:
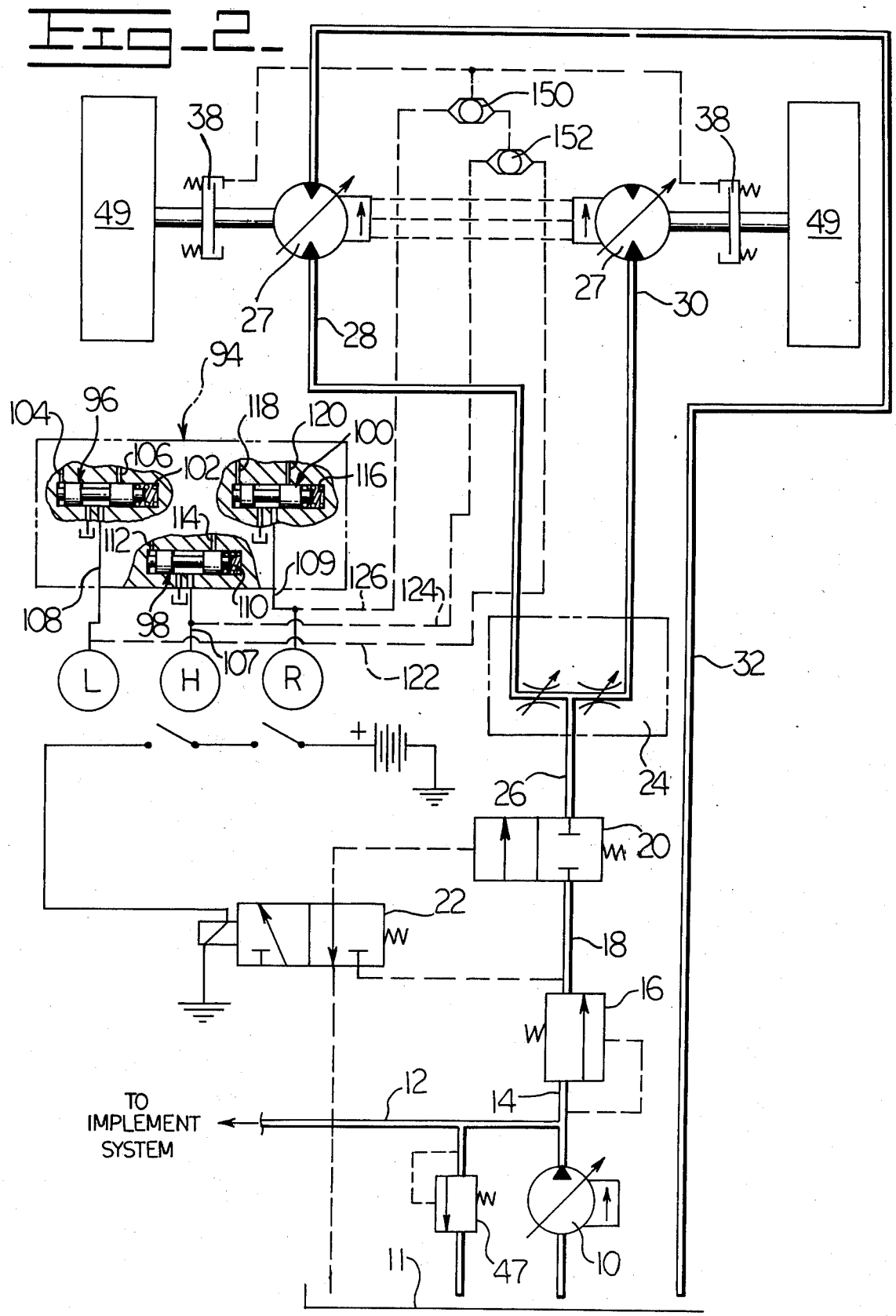
FIG. 2 is a schematic illustration of a second embodiment of an auxiliary front wheel drive system for a vehicle.

In the embodiment of FIG. 2, the operation of the system is substantially the same as that of FIG. 1. However, in FIG. 1 clutch actuation was achieved by application of fluid pressure through branch conduits 40,42 extending from the main pressurized conduits 28,30 communicating with the motors 27. In the FIG. 2 system, the clutch actuation is accomplished by signal pressure from the primary drive system transmission control 94 that signals the motors 27. Such clutches 38, of course, as in FIG. 1, are engageable upon application of fluid pressure thereto to effect a power transmitting or driving condition between the respective motors 94 and wheels 49, and disengageable to disconnect the motors 27 and wheels 49. It will thus be seen that means operatively connect the clutches 38 and transmission control 94 for engaging and disengaging the clutches 38 in response to the transmission control 94. It will also be understood that the transmission control 94 determines a plurality of transmission control fluid pressures, in conduits 122,124,126, which may be at variance with each other. A pair of shuttle valves 150,152 are associated with these conduits 122,124,126 to direct the greatest of the transmission control fluid pressures to the clutches 38 for actuation thereof. Clutch actuation is thus responsive to transmission signal pressure, permitting the deletion of the restrictor valve 34 of FIG. 1 from this FIG. 2 system. That is, clutch actuation is not responsive to maintenance of a predetermined back pressure in the system. In the embodiment of FIG. 2, upon achievement of a primary drive condition, it is insured that transmission signal pressure is applied through one of the appropriate conduits 122,124,126 to actuate the clutches 38.

In FIG. 3 is shown a further modification of the drive motor portion of the system. In such FIG. 3 embodiment, clutches are not included for providing driving connection between the motors 27' and the wheels 49 associated therewith. Rather, the drive motors 27' are of the high speed, variable displacement, over center type, such motors 27' being capable of operating at rotational speeds of up to 10,000 R.P.M. The motor control method is similar to that used in FIG. 1, that is, transmission control pressure from the primary drive system 94 signals the motors 27' to shift their displacement to an angle which establishes the rotational speed of the drive wheel motors 27' approximately equal in magnitude to that in the primary drive wheel system.

In FIG. 4 is shown a system that is a modification of the system shown in FIG. 3, in that the motor control has been changed to provide a pilot control for the motors 27' which is actuated by an external signal. Pressurized fluid is directed to the drive wheel motors 27' by conduits 28,30, and the return flow is directed to tank via conduit 32. A pair of motor control valve 160 direct pressurized fluid in conduits 162,164, branches of conduits 28,30 respectively, to the motors 27'. The motor control valves 160 receive a pilot signal which corresponds to the vehicle speed and causes valves 160 to shift and direct reduced pressure to the motors 27', which, in turn, causes the motors 27' to shift to a displacement which corresponds to the rotational speed of the drive wheels. The control valves 160 are of the modulating type and direct reduced pressure to provide variable displacement control. Conduits 166,168 are connected to conduit 32, which is ultimately connected to tank. The pilot signal lines 170,172,174 which actuate the control valves 160 could so actuate such control valves 160 electrically, hydraulically or pneumatically.

What is claimed is:

1. In a vehicle having a variable transmission control for determining a drive speed of the vehicle, an auxiliary drive system for said vehicle associated with a wheel thereof comprising a variable displacement fluid motor associated with said wheel thereof, means for transmitting power from the motor to drive the wheel, a fluid pump, fluid circuit means operatively connecting the pump and motor, and means operatively connecting the transmission control and motor to vary the displacement of the motor in response to said transmission control to provide a rotative speed of the motor corresponding to the drive speed of the vehicle, wherein the means for transmitting power from the motor to drive said wheel comprise clutch means engagable upon application of fluid pressure thereto to effect a driving condition between the motor and wheel, and disengagable to disconnect the motor and wheel, and means operatively connecting the clutch means and transmission control for engaging and disengaging the clutch means in response to said transmission control.

2. The apparatus of claim 1 wherein the transmission control determines a plurality of transmission control fluid pressures, and further comprising means for applying the greatest of the transmission control fluid pressures to the clutch means.

3. The apparatus of claim 2 wherein the means for applying the greatest of the transmission control fluid pressures to the clutch means comprise shuttle valve means.

* * * * *